Sept. 2, 1969  CHUNG-WIE CHANG  3,464,687
APPARATUS FOR CONTINUOUS STEEL REFINING
Filed Dec. 1, 1966  2 Sheets-Sheet 1
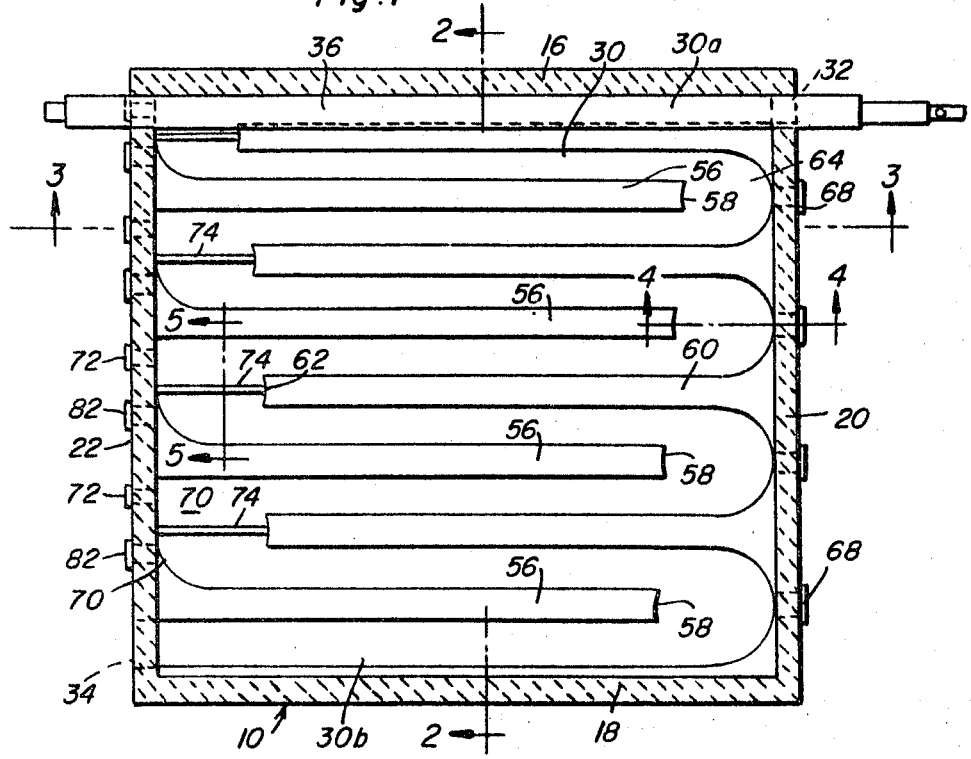
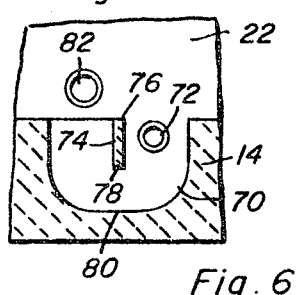
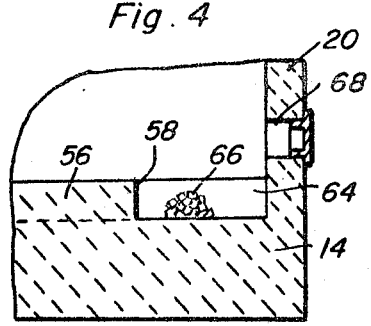
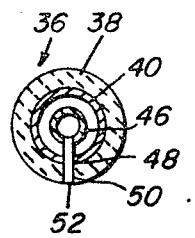
Chung-Wie Chang
INVENTOR.

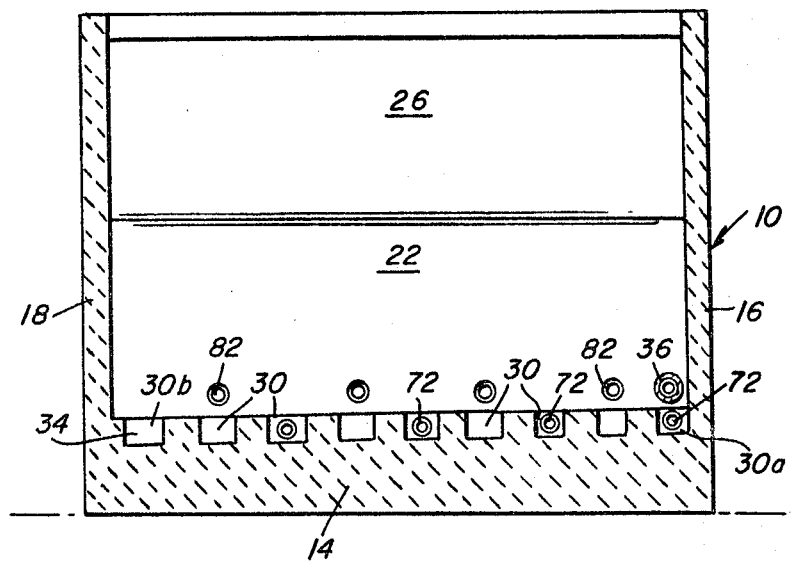
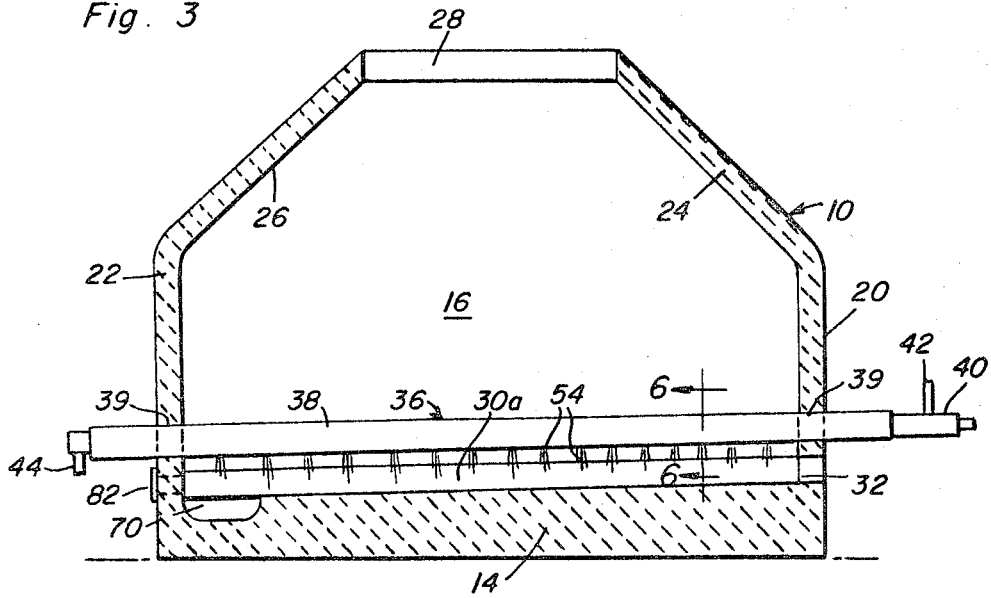

United States Patent Office 3,464,687
Patented Sept. 2, 1969

3,464,687
APPARATUS FOR CONTINUOUS STEEL REFINING
Chung-Wie Chang, 10 1st Chian Sen St.,
Kaohsiung, Taiwan
Filed Dec. 1, 1966, Ser. No. 598,403
Int. Cl. C21c 5/48; F27b 3/10
U.S. Cl. 266—37                                         6 Claims

ABSTRACT OF THE DISCLOSURE

A hearth with enclosing walls forming a furnace with a series of zigzag inclined channels therein receiving molten unpurified iron at one end and discharging molten purified steel at the other. The juncture areas between the channels have pools, certain of them have means for discharging slag and certain of them have means for introducing scraps and oxygen lances overlie the channels for discharging oxygen onto the molten iron.

---

The present invention generally appertains to furnaces and processes for making steel and more particularly relates to a novel method and furnace for effecting continuous steel refining from the molten unpurified iron state to the final refined steel state.

In the usual process of making steel, iron ore compounds are subjected to a smelting procedure so as to reduce the ore to a molten state, known as molten pig iron. The reduction of iron ore to pig iron is carried out in conventional blast furnaces and then the refining step is carried out wherein the molten unpurified iron from the smelting furnace is subjected in batches to the action of oxygen and of flux ingredients for refining the molten charge. Such treatment is known as batch treatment which is effected by a conventional batch converter. Such batch converter requires an iron mixer and heavy cranes for charging and discharging purposes, for moving and rotating equipment and large foundations. In such batch treatment, oxygen is introduced into the converter, which is a vessel containing a molten charge, the charge batch being subjected to the action of the oxygen for a period sufficient to refine the entire contents of the converter. Then, the treated molten batch is poured into other equipment, such as ladles, for further processing.

Conventional batch processing, using conventional batch converters and attendant cranes and other moving and rotating equipment, necessitates time delays due to the emptying and refilling of the converter for each charge to be refined and necessitates considerable equipment, which increases the cost of processing steel on a large scale and has the drawback that the refined steel varies from batch to batch so that there is a lack of uniformity.

An important object of the present invention is to provide a process and apparatus for effecting a continuous refining of the steel so that there is no refilling and emptying cycle as required by the conventional batch converter.

Another important object of the present invention is to provide a process and apparatus for carrying out the continuous refining of steel from the constant introduction of molten iron at one point into the hearth of a heated furnace and the constant withdrawal of the refined steel from another point in the furnace, which process and apparatus can be used in conjunction with conventional blast furnaces and continuous cast molding equipment.

Another important object of the present invention is to provide a method of continuously refining molten unpurified iron by introducing the molten iron at one point into the hearth of a heated furnace and passing the molten iron in a continuous but separated zigzag inclined course from the inlet to an outlet with the separated channels of the course being progressively greater in volume and being inclined in reverse fashion from the inlet to the outlet, subjecting the molten iron in its passage along the courses to oxygen in a very simple but highly effective manner and adding, at various points, along the course additional scraps and drawing off slag at certain points along the course.

Another object of the present invention is to provide, in combination with the foregoing object, the additional steps of adding scraps to the continuously moving molten iron so that as the molten iron and scraps travel further through the zigzag course, defined by channels in the hearth of a continuous steel furnace, constructed in accordance with the present invention, the silicon content of the charge will be eliminated to 0.015–0.20% and, at such stage, the slag can be removed. In the meantime, the oxidation rate of manganese and carbon is increased to complete the refining process.

Another important object of the present invention is to provide, in the foregoing process, the step of adding alloy metals to the constantly and continuously moving molten steel, as the carbon content is decreased to the required point.

Another important object of the present invention is to provide a novel continuous steel refining furnace having a hearth formed with end communicating separated channels arranged in a zigzag course, from an inlet to an outlet, with the channels being formed in reverse inclined fashion and in progressive wider sizes so that the molten iron will flow speedily in the zigzag course and so that volume of the molten iron can be increased from channel to channel by adding scraps or alloy metals can be added to the channels, such means being associated with the sides of the furnace and including novel structural means at the ends of the channels whereby slag may be drawn off and whereby scraps or alloy metals may be added without disturbing the continuous and constant flow of the molten iron.

Another important object of the present invention is to provide a novel oxygen lance arrangement in association with the channels whereby the rate of oxygen can be controlled and whereby the oxygen from the lance nozzles is uniformly distributed, thus making it possible to control more easly the quality of the steel. Further, in connection with such object, the air pressure is not as high as that used in the batch converter which is equipped with large lances and, thus, erosion of the air to the refractory is reduced.

Another important object of the present invention is to provide a continuous operation, which is much safer than a batch process and which is considerably reduced, from an economic and time standpoint, in comparison with conventional batch converters or other known apparatus for a continuous process of steel making.

Another important object of the present invention is to provide a process and apparatus for the continuous refining of steel whereby the quality of the steel products is much better than that from batch processes or other processes or apparatuses for continuous steel making.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a horizontal, cross-sectional view of a furnace, constructed in accordance with the present invention;

FIGURE 2 is a vertical, longitudinal sectional view, taken substantially on line 2—2 of FIGURE 1 and showing the arrangement of the channels in the hearth of the furnace and illustrating the means for withdrawing slag and for adding scraps or alloy metals;

FIGURE 3 is a vertical, cross-sectional view, taken substantially on line 3—3 of FIGURE 1 and showing in section the furnace construction and in elevation one of the oxygen lances, illustrating the arrangement of the oxygen lance and its orientation with respect to one of the channels, it being understood that an oxygen lance will overlie each of the channels and be in operative association therewith, as shown in FIGURE 3;

FIGURE 4 is a fragmentary, detailed vertical, cross-sectional view, taken substantially on line 4—4 of FIGURE 1 and illustrating means whereby additional charges, such as scraps or alloy metals can be added to the continuous zigzag course in the hearth, which course is made up of the channels, which are individual and separate but are in communication at their ends to form the zigzag course from the inlet to the outlet;

FIGURE 5 is a fragmentary longitudinal vertical sectional view, taken substantially on line 5—5 of FIGURE 1 and showing the means whereby slag may be withdrawn at certain of the ends of the intercommunicating channels and the ends may be charged with iron scraps; and, FIGURE 6 is a fragmentary cross-sectional view, taken substantially on line 6—6 of FIGURE 3 and illustrating in detail the construction of the oxygen lances.

Referring now more particularly to the accompanying drawings, the reference numeral 10 generally designates a steel refining furnace, which is constructed in accordance with the present invention and which includes a hearth 14 from which end walls 16 and 18 upstand. As shown in FIGURE 3, the furnace further includes upstanding side walls 20 and 22 which have inwardly inclined upper end portions 24 and 26 providing an upper open end 28. The furnace is formed from suitable conventional materials, such as brick or other refractory materials.

The hearth 14 is formed with a continuous zigzag, communicating course, constituted by zigzaggedly arranged, intercommunicating channels 30 formed in the upper surface of the hearth 14. The channels are formed in a continuous zigzag pattern from the end wall 16 to the end wall 18 with the channel 30a constituting an inlet channel in communication with the inlet 32 and the channel 30b constituting an outlet channel in communication at its outer end with an outlet 34. The molten unpurified iron from the smelting furnace is introduced constantly and continuously into the inlet 32 and flows constantly and continuously through the course, defined by the zigzag, intercommunicating series of channels 30 to and through the outlet 34 from which it emerges as molten refined steel.

As the molten iron passes through the channels, an oxygen or oxygen-rich gaseous stream, in the form of jet blasts, is directed onto the molten metal in each course. Thus, an oxygen lance 36 is provided in association with each of the channels. For the sake of simplicity, only one lance has been shown and has been shown in structural and functional association with the channel 30a.

The oxygen lance 36 comprises an annular outer fire brick wall 38, which extends through openings 39 in the side walls 20 and 22 and is positioned above the channel 30a and is disposed parallel therewith and extends the full length thereof. Concentrically arranged within the outer fire brick annular wall 38 is an annular water pipe 40 through which water passes. The pipe 40 is formed, exteriorly of the furnace, with an inlet 42, at one end thereof, and an outlet 44 at the other end thereof. Concentrically arranged within the water pipe 40, through which water passes from the inlet 42 to the outlet 44 is an annular inner pipe 46, which carries oxygen. The pipe 46 is formed with radially projecting nozzles 48 that pass through the hollow interior of the water pipe 40 and through radial openings 50 in the outer fire brick covering 38 and have outlet jet ends 52 from which oxygen jet blasts 54 project, the blasts 54 projecting downwardly onto the molten iron in the channel 30a. In this respect, it is to be noted that the oxygen lance 36 is spaced very slightly above the upper surface of the walls defining the channel 30a so that the blasts 54, which are spaced very close together and evenly along the entire length of the lance 36 are directed onto the entire moving portion of the molten iron passing through the channel 30a. This is also true of the lances provided in structural and functional association with each of the other channels 30 in the series from the end wall 16 to the end wall 18.

It can thus be seen that the oxygen blasts 54 from the lance nozzles 36 are uniformly distributed. This makes it possible to control more easily the steel quality. The air pressure is not as high as that used in a batch converter or in known furnaces which are equipped with large lances or which have lances with the oxygen projecting forcibly from end nozzles. Therefore, erosion of the air to the refractory is reduced.

The molten pig iron, as aforestated, is introduced into the initial channel 30a through the inlet 32, in the side wall 20 adjacent the end wall 16. The channels 30 slope back and forth from the side wall 20 to the side wall 22, as can be appreciated from FIGURES 2 and 3. Thus, each adjoining channel is inclined in an opposite direction between the side walls 20 and 22 from the initial inlet channel 30 or to the final outlet channel 30b. An outlet 34 is formed in the side wall 20 adjacent the end wall 18 and in outlet communication with the outlet channel 30b. It can be appreciated, from a consideration of FIGURE 2, that the channels 30 are formed in progressive wider sizes but are of the same depth so that the volumetric capacity of the channels is progressively increased by virtue of the progressive increase in the width of the successive channels from the inlet end wall 16 to the outlet end wall 18. In other words, the channels progress in wider sizes and even fashion so that the inlet channel 30a is smaller in width than the outlet channel 30b, as can be appreciated from a consideration of FIGURE 2. The reason for this is that the volume of the molten iron will be increased from channel to channel by adding scraps or alloy metals in the refining stages, while, due to the reverse inclination or slope of the channels, the molten iron will flow at a fast constant rate through the zigzag course from the inlet 32 to and through the outlet 34.

The channels are divided or formed by partition walls 56, which extend from the side wall 20 and terminate in concave free ends 58 that are spaced from the side wall 20, and by parallel partition walls 60 which extend from the side wall 20 and terminate in free concave ends 62 which are spaced from the side wall 22. It is by virtue of the partition walls that the channels are formed and by virtue of the arrangement of the partition walls, some projecting from the side wall 22 and being spaced from the side wall 20 and some extending from the side wall 20 and being spaced from the side wall 22 that the individual channels are formed in a zigzag but communicating fashion. In other words, the channels communicate at their opposing ends.

In the latter respect, arcuate communicating spaces 64 are formed between the channels, adjacent the side wall 20, shown in FIGURES 1 and 2. The communicating spaces 64 are on the interior of the side wall 20 and are of the same depth as the channels.

The purpose for the communicating spaces 64, which are realized by the terminating ends 58 of the partitions 56 that project from direct structural relation with the inner surface of the side wall 22, is to provide intercommunicating means and to provide arcuate communicating pockets for the reception of additional charges 66 of scraps or alloy metals, the scraps or alloy metals 66, as shown in FIGURE 4, being introduced into the communicating pockets or portions 64 through charge doors 68 formed in the side wall 20, as shown in FIGURES 1 and 4.

By virtue of the termination of the ends 62 of the partitions 60 at a distance from the inner surface of the side wall 22, pools 70 are established. The pools 70, as shown in FIGURE 5, are arcuate or curved in cross-section and are concave in vertical dimension and are of a depth greater than the depth of the channels, as can be appreciated from a consideration of FIGURES 3 and 5.

The purpose of forming the pools so that they are arcuate and are of a greater depth in communicating the channels at their ends adjoining the side wall 22 is to provide draw off doors 72 formed in the side wall 22 adjacent the upper most portion of the lower end of the channel slanted or inclined toward the side wall 22, as can be appreciated from FIGURE 5. The slag discharge doors 72 permit the slag to be skimmed off the constantly flowing molten iron and to assist, in this regard, baffle plates 74 are vertically formed between the side wall 22 and the ends 62 of the partitions 60 with the baffle plates 74 being disposed in a plane at the upper ends of the pools 70 and having upper edges 76 which lie coplanar with the upper edges of the partition walls, while having lower edges 78 which are spaced considerably above the bottom walls of the pools 70, as shown in FIGURE 5. Thus, the flowing molten material, which flows more rapidly toward the side wall 22, is forced to flow under the baffle plates 74 and around the lower edges 78 thereof and this permits the slag to be drawn off through the slag discharge doors 72.

Charge doors 82 are formed in the side wall 22 above the pools 70 and are arranged on the downstream side of the partition 74, that is, on the side of the partitions facing the end wall 18 and are provided and so arranged so that scraps or alloy metals can be added to prevent damage from charging scraps into the pool 70.

The operation of the furnace 10 is extremely simple. Before charging the molten pig iron, the furnace 10 is preheated to about 2500–2800° F., with an conventional method. Then, molten pig iron and lime, if used, is charged into the furnace from the inlet 32. The flow is constant and continuous and, as the molten pig iron passes through the zigzag course from the inlet 32 to the outlet 34, the course being defined by the reversely downwardly sloped or inclined endwise intercommunicating channels 30 in series, oxygen is delivered from the lances 36. The rate of oxygen is controlled to approximately 20 pounds per hour for each nozzle. Scraps 66, if added, are charged into the spaces 64 or are charged into the pools 70 through the charge doors 68 and 82.

Oxidation of silicon and manganese in the charge will be noted at the first stage in the refining process. Heat evolution from this proces is utilized for melting the solid scraps 66 which are added. The lime combines with silicon formed by selective oxidation of silicon and forms a liquid slag. In the first stage of steel refining as the material passes through the initial part of the zigzag course there is very little oxidation of carbon.

As the molten iron and scraps flow further through the channels and the refining process continues, the silicon content of the charge will be eliminated to 0.015–0.20%. It is at this stage that the slag, as formed in the first stage, can be removed, through the slag discharge or removal doors 72. In the meantime, the oxidation rate of carbon is increased to complete the refining process. As the carbon content is decreased to the required point, alloy metals may be added through the charge doors 68 or 82 as required by the process to make alloy steel.

As pointed out in the foregoing, the reason why the channels 30 are formed in progressive wider sizes is that the volume of the molten iron will be increased from channel to channel because of the addition of scraps or alloy metals in the refining stages.

As noted in FIGURE 5, molten iron and slag will flow toward the pools 70 and the baffle plate 74 will cause the flow to flow thereunder and will permit the slap to be discharged through the slag discharge doors 72.

As required by the refining process, addition of flux such as lime, silica, and the like can be made at the pools 70 while the alloy materials 66 can be charged at the portions 64. However, this is merely a desired practice and it can be appreciated that the charge doors 68 and 82 can be used for adding alloy, scraps or steel alloys, as the process continues, while lime, silicates and the like can be added to the constantly flowing molten iron, during the continuous process, through the charge doors 82.

It can be appreciated that the furnace provides a continuous steel refining process and that there is no refilling and emptying cycle, as required by the conventional batch converter. Further, the furnace capacity can be increased as the operation continues, due to the arrangement and construction of the channels and the provision of the charge doors in the side walls and the provision and arrangement of the channels and communication of the ends thereof at the spaces 64 and pools 70.

It can also be appreciated that there is no thermal shock to the furnace refractory due to the fact that the temperature is constant and uniform in the continuous operation as the molten iron flows continuously and constantly from the inlet 32 to the outlet 34 and is treated by the oxygen blasts 54 from the oxygen lances 36 that is the addition of flux such as lime, silicates and the like, as required by the refining process.

The life of the furnace refractory is considerably increased because there are no impact forces upon the refractory and the hearth is constructed, by virtue of the formation of the zigzag courses or channels, so that there is an even distribution of heat and constant and continuous flow of molten iron.

The oxygen from the lance nozzles 36 is uniformly distributed and this makes it possible to control the steel quality more easily. The air pressure is not as high as that used in a batch converter which is equipped with large lances, as aforestated, so that erosion of the air to the refractory is reduced.

Furthermore, it can be appreciated that the continuous operation, as afore briefly described and which can be appreciated from a consideration of the drawings, is much safer than a batch process. It can also be appreciated that only a small foundation is needed for the stationary furnace and that no moving parts or components are required and that no heavy cranes are needed for charging and discharging so that the furnace costs can be greatly reduced. It has been found that the continuous steel refining operation, made possible by the process and furnace of the present invention, results in considerable reductions in costs while the quality of the steel products from the furnace is much better.

If desired, the end spaces or communicating portions may be formed exactly as the pools 70 so that there would be pool and baffle arrangements with slag draw-off or discharge doors at each of the sides 20 and 22.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A steel refining furnace comprising a hearth enclosed by upstanding walls, a plurality of substantially parallel channels defining said hearth with adjacent channels having one end communicating to define a continuous flow path, means at one end of said path for admitting molten unpurified iron, means at the other end of said path for discharging molten purified iron, said path being inclined from said one end to the other for gravity flow, means along said flow path for discharging impurities from the molten iron, and means along said flow path for discharging oxygen into contact with the molten iron.

2. The furnace as defined in claim 1 together with means along said flow path for admitting scraps into the molten iron, said means discharging oxygen including pipe means overlying said hearth and having a plurality of downwardly discharging nozzles.

3. A continuous steel refining furnace comprising a hearth having opposing ends and opposing sides, a series of separated channels formed in the upper surface of the hearth and extending in substantially parallel and separated fashion from one side to the other parallel with the ends, one of the channels at one end having an inlet for molten pig iron and the channel at the other end having an outlet for purified molten steel, said channels being in communication at their ends at each side, one of said sides being provided with means for the introduction of scraps into the communicating ends of adjoining channels and the point of communication of the channels at least at one side including the formation of pools in the hearth, said pools being of greater depth than the channels.

4. The invention of claim 3, wherein said adjoining channels are sloped downwardly in opposite directions from one side to the other side.

5. The invention of claim 4 and including means at the pools permitting slag to be withdrawn from the channels and vertical baffle plates overlying the pools and spaced from the bottoms thereof and coplanar with the tops of the communicating channels.

6. The invention of claim 5 and including oxygen lances extending transversely of the hearth and longitudinally overlying each of the channels parallel therewith, said oxygen lances having jet nozzle means spaced along their lengths whereby jet blasts of oxygen are evenly distributed onto the molten iron passing through each channel.

References Cited
UNITED STATES PATENTS

| | | | |
|---|---|---|---|
| 2,526,472 | 10/1950 | Gilliland | 266—34 X |
| 3,343,828 | 9/1967 | D'A Hunt | 266—33 X |
| 3,288,594 | 11/1966 | Smith | 75—65 X |

J. SPENCER OVERHOLSER, Primary Examiner

R. SPENCER ANNEAR, Assistant Examiner

U.S. Cl. X.R.

266—34